United States Patent

[11] 3,599,746

| [72] | Inventors | Raymond Leslie Davis<br>Southampton;<br>Daniel Cecil Edward Fish, Brockenhurst;<br>Ronald Christopher Fishlock,<br>Southhampton, all of, England |
|---|---|---|
| [21] | Appl. No. | 839,501 |
| [22] | Filed | July 7, 1969 |
| [45] | Patented | Aug. 17, 1971 |
| [73] | Assignee | Hovermarine Limited<br>Southampton, England |
| [32] | Priority | July 5, 1968 |
| [33] | | Great Britain |
| [31] | | 32086/68 |

[54] GAS CUSHION VEHICLES
4 Claims, 6 Drawing Figs.

[52] U.S. Cl. .................................................... 180/127,
180/126
[51] Int. Cl. ..................................................... B60v 1/16
[50] Field of Search ............................................ 180/126,
127, 128

[56] References Cited
UNITED STATES PATENTS

| 3,430,725 | 3/1969 | Nicholas..................... | 180/126 |
| 3,465,844 | 9/1969 | Page et al. ................... | 180/127 X |

FOREIGN PATENTS

| 1,110,798 | 4/1968 | Great Britain................ | 180/128 |

*Primary Examiner*—A. Harry Levy
*Attorney*—Cushman, Darby and Cushman

ABSTRACT: An air cushion vehicle is provided with a flexible skirt for containing at least part of the vehicle-supporting cushion. The skirt comprises a succession of contiguous skirt members flexibly suspended beneath the vehicle body by a series of flexible straps attached to the upper areas of the skirt members, a flexible wall extending between the straps and an outer part of the vehicle body and a series of tie cords extending between the straps and an inner part of the vehicle body.
The arrangement results in operating loads applied to the skirt members being transferred to the vehicle body by way of the flexible wall straps and tie cords.

PATENTED AUG 17 1971　　　　　　　　　　　　　3,599,746
SHEET 1 OF 2
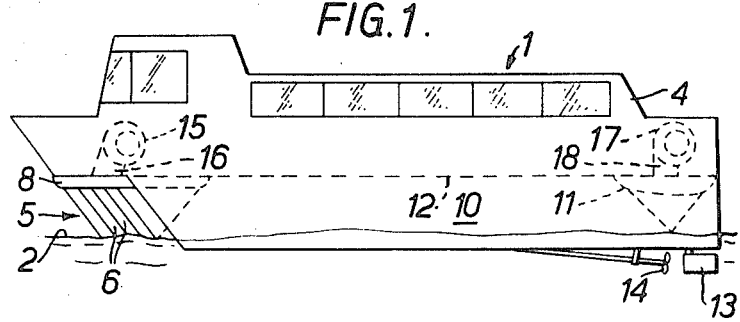
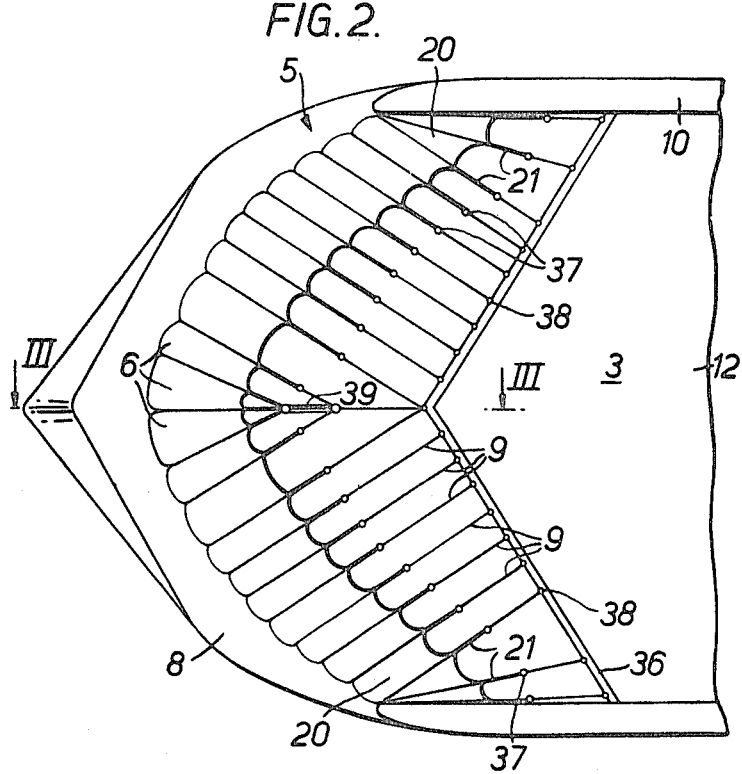
Inventors
Raymond Davis
Daniel Cecil Edward Fish
Ronald Christopher Fishlock
By Cushman, Darby & Cushman
Attorneys Inventors
Raymond Davis
Daniel Cecil Edward Fish
Ronald Christopher Fishlock
By Cushman, Darby & Cushman
Attorneys

GAS CUSHION VEHICLES

This invention relates to gas cushion vehicles, that is to say, to vehicles for travelling over a surface and which, in operation, are supported above that surface, at least in part, by a cushion of pressurized gas, for example, air formed and contained between the vehicle body and the surface.

The invention is concerned with gas cushion vehicles wherein the vehicle-supporting cushion is contained, at least in part, by a flexible skirt attached to and depending from the vehicle body.

One form of flexible skirt comprises a succession of contiguous skirt members which deflect independently of each other as the vehicle travels over an irregular surface, such as waves. The skirt members are flexibly suspended beneath the vehicle body by an inflated structure, such as a bag, so that the whole provides a two-stage flexible skirt wherein the upper stage comprises the bag and the lower stage the skirt members.

However, the bag requires a substantial amount of flexible material for its construction and so is expensive. Also, when the vehicle to which it is attached operates over the water, the bag tends to collect water which adds weight to the vehicle and stresses the bag material. Furthermore, in order to transfer, to the vehicle body, the substantial working loads imposed on the skirt members during operation of the vehicle, the bag material has to be strong and thus less flexible than desired.

According to the present invention, a gas cushion vehicle is provided with a flexible skirt for containing, at least in part, the vehicle-supporting cushion, the skirt comprising a succession of contiguous skirt members flexibly suspended beneath the vehicle body by a series of flexible support members of elongated form extending inwardly relative to the cushion, and from which the skirt members depend, a flexible wall extending between the outer ends of the support members and the vehicle body and a series of ties extending between the inner ends of the support members and the vehicle body, whereby operating loads imposed on the skirt members are accepted by the support members and are transferred to the vehicle body by way of the flexible wall and the ties.

The flexible wall preferably incorporates a series of ties extending between the vehicle body and the outer ends of the support members whereby at least the major part of the loads imposed on the flexible wall are accepted by the ties, leaving the remainder of the flexible wall to be subject to substantially only the pressure differential of skirt inflation pressure and atmosphere.

The invention also comprises a flexible skirt member of flexible sheet material foldable to form a lateral portion flanked by a pair of side portions, and flexible members attached to and extending along said side portions for flexibly connecting the skirt member to the body of a gas cushion vehicle so as to contain cushion gas.

An embodiment of the invention will now be described by way of example with reference to the accompanying drawings wherein:

FIG. 1 is a side view of a 'sidewall' gas cushion vehicle.

FIG. 2 is a view, to an enlarged scale, of the front underside of the vehicle.

Figure 3:
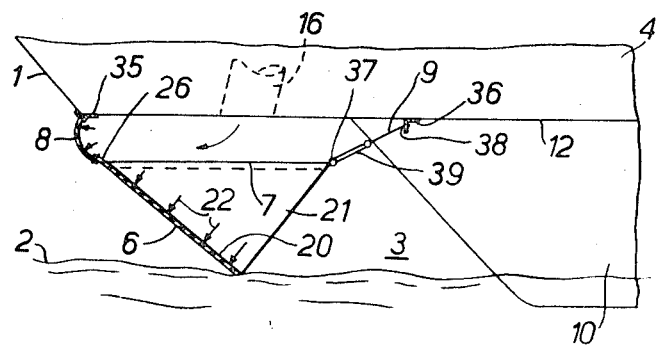
FIG. 3 is a section taken on the lines III–III of FIG. 2.

With reference to FIGS. 1 to 3, a gas cushion vehicle 1 of the 'sidewall' type is shown travelling over the surface 2 of water and is supported above the surface 2 by a cushion 3 of pressurized air formed and contained between the vehicle body 4 and the surface. The front end of the cushion 3 is contained by a flexible skirt 5 comprising a succession of contiguous skirt members 6 flexibly suspended beneath the vehicle body 4 by a series of flexible members of elongated form, in this example, comprising nylon webs or straps 7, extending inwardly (in a substantially horizontal direction) relative to the cushion 3, and from which the skirt members 6 depend, a flexible wall 8 extending between the outer ends of the webs 7 and the vehicle body 4 and a series of 9 extending between the inner ends of the webs 7 and the body 4 whereby operating loads imposed on the skirt members 6 are accepted by the webs 7 and are transferred to the vehicle body 4 by way of the flexible wall 8 and the ties 9.

In further detail, the sides of the vehicle supporting cushion 3 are contained by a pair of laterally spaced wall structures 10 (sidewalls) of rigid construction extending longitudinally along the sides of the vehicle body 4 in directions substantially parallel to the fore and aft axis of the vehicle and depending from the body sides so as to dip into the water 2 and form a seal. The rear end of the cushion is contained by a two-stage flexible skirt 11. The skirts 5, 11, which are of rubberized fabric, extend laterally between the ends of the sidewalls 10, are attached to the undersurface 12 of the vehicle body and depend therefrom so as to be in light contact with the water surface 2. The vehicle 1 is steered by pairs of rudders 13 and propelled by pairs of water screws 14 each of which is mounted on the sidewalls 10.

Air forming the cushion 3 is provided by a row of four laterally disposed fans 15 (one only being shown) connected to the space occupied by the cushion 3 (i.e. the cushion space) by ducts 16. The skirt members 6, which are of U-like lateral cross section (when viewed in plan) are inflated by cushion air. The rear skirt 11 is of inflatable construction also but is of "closed" form. It is inflated by a fan 17 by way of a supply duct 18 connected thereto.

As best shown in FIG. 3, each skirt member 6 comprises a generally triangular-shaped sheet of lightweight (18 oz. per square foot) flexible material folded over to give it the U-shaped lateral cross section with a downwardly and inwardly inclined middle or lateral portion 20 flanked by a pair of inwardly extending side portions 21. Inflation loads 22 acting normal to the inner surface of the lateral portion 20 are transferred to the webs 7 by way of the side portions 21, which thus serve as ties. A web 7 is stitched to the upper margin of each side portion 21 and the inflation loads 22 transferred to the webs are then (as explained hereinafter) transferred to the vehicle body 4 by way of the flexible wall 8 and ties 9.

Figure 4:
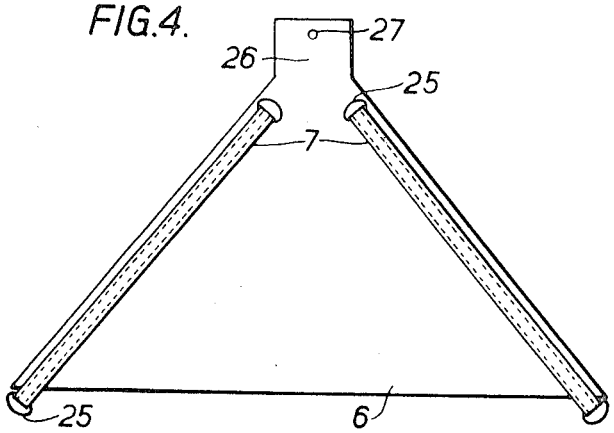
FIG. 4 is a plan view of an unfolded skirt member 6.

With reference now to FIG. 4, the webs 7 are stitched face-on to one surface of the sheet forming a skirt member 6. The ends of each web are folded over and stitched back so as to form loops which locate nylon rings 25. The "apex" of the sheet is provided with a flexible, flaplike extension 26 perforated by a hole 27.

Figure 5:
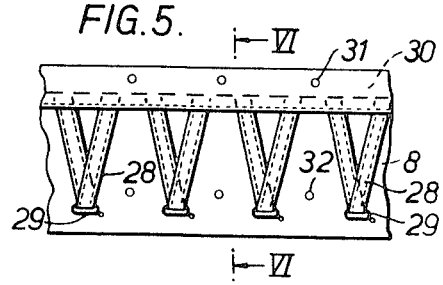
FIG. 5 is a plan view of the flexible wall 8.
Figure 6:
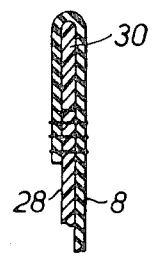
FIG. 6 is a part section, to an enlarged scale, taken on the lines VI–VI of FIG. 5.

As shown in FIGS. 5 and 6, the flexible wall 8 is of relatively heavy (45 oz. per square foot) flexible material. Lengths of nylon web 28 are folded over to form V's as shown and these webs are stitched face-on and in spaced-apart relationship, to the inner surface of the wall 8. The folded over, lower portions of the webs 28 form loops which locate shackles 29. The lateral spacing of the lower looped portions of the webs 28 corresponds to the lateral spacing of the webs 7 of the skirt members 6. The upper edge of the flexible wall 8 is folded over and stitched down to form a pocket locating a nylon strip 30. The upper edge of the assembly is then drilled to form a row of holes 31, each hole being disposed between a pair of webs 28. A row of holes 32 is also formed in the lower half of the wall 8, each hole 32 being disposed between a pair of webs 28. With reference now to FIG. 3, the bottom surface 12 of the vehicle body 4 carries beams 35, 36 of right angle section and of generally V-like shape (when viewed in plan). The beam 35 is disposed at the bow of the vehicle 1 and the beam 36 is disposed to the rear of the skirt 6. The beams 35, 36 are perforated by rows of holes (not shown). The flexible ties 9 extend inwardly and upwardly from the webs 7 to the beam 36. The ties, except for those serving the front four skirt members 6, are of nylon rope and are demountably attached to adjacent pairs of rings 25 and to the beam 36 by shackles 37, 38, the shackles 38 being located by the holes in the beam 36. The ties serving the front four skirt members 6, which also uses shackles 37, 38, are collected together by a nylon strap 39 which is then connected to the beam 36 by a heavier grade of nylon rope.

To fit the skirt 6 to the vehicle 1, the flexible wall 8 is offered to the front beam 35 and is then attached thereto, by nuts, bolts and nylon washers, the bolts passing through the holes 31 in the wall. The skirt members 6 are then attached to the wall 8, first by bolting (again using nylon washers as well) the extensions 26 to the wall 8, the bolts being passed through the holes 27 in the skirt members 6 and holes 32 in the wall 8. The extensions 26 are bolted to the inner surface of the wall 8 so as to provide a good cushion air seal. Adjacent ends of the webs 28 and neighboring pairs of webs 7 are next attached to each other by the rings 25 and shackles 29.

Finally, the webs 7 attached to adjacent side portions 21 of neighboring skirt members 6 are collected together and attached to the beam 36 by the ties 9 and shackles 37, 38, each tie 9 (except for the front four skirt members 6) serving a pair of webs 7.

In operation, the inflation loads 22 (FIG. 3) acting on the lateral portions 20 of the skirt members 6 are transferred through the side portions 21 to the webs 7 attached thereto. The webs 7 are strong enough to readily accept these loads and they then transfer them in turn to the vehicle body 4 by way of the flexible wall 8 and the ties 9. The wall 8 incorporates the nylon webs 28 which accept the major portion of the loads transferred to the wall and which "spread" the relatively small remainder over the portions of the wall "enclosed" by each V-like web. Thus, the nonweb portion of the wall 8 is not subject to loads substantially greater than the pressure differential acting across the wall.

The parts of the flexible skirt 6 which are most likely to wear are the skirt members 6 which are readily replaceable. If desired, the webs 7 of the worn skirt members may be detached for reuse on other skirt members.

The invention provides a very strong flexible skirt, yet is able to defect readily.

It will be appreciated that use of the skirt need not be restricted to sidewall gas cushion vehicles but it can also be used on other forms of gas cushion vehicles, including pallets and similar apparatus, where it may be of annular form so as to contain the gas cushion around the whole of its periphery.

We claim:

1. A gas cushion vehicle provided with a flexible skirt for containing, at least in part, the vehicle-supporting cushion the skirt comprising a succession of contiguous skirt members flexibly suspended beneath the vehicle body by a series of pairs of flexible elongated straps attached to each of said skirt members and extending inwardly relative to the cushion, and from which the skirt members depend, a flexible wall extending between the outer ends of said straps and the vehicle body means securing said straps to said flexible wall and a series of ties extending between and secured to the inner ends of said straps and the vehicle body whereby operating loads imposed on the skirt members are accepted by said straps and are transferred to the vehicle body by way of the flexible wall and said ties.

2. A vehicle as claimed in claim 1 wherein said means comprises a series of tie means in said flexible wall extending between the vehicle body and the outer ends of said straps, and additional means securing the adjacent ends of said tie means and said straps.

3. A vehicle as claimed in claim 1 wherein each skirt member comprises a sheet of flexible material folded to form a middle portion flanked by a pair of side portions extending inwardly from the middle portion.

4. A gas cushion vehicle provided with a flexible skirt for containing at least in part, the vehicle-supporting cushion, the skirt comprising a succession of contiguous skirt members flexibly suspended beneath the vehicle body by a series of flexible support members of elongated form extending inwardly relative to the cushion, and from which the skirt members depend, each of said skirt members comprising a sheet of flexible material folded to form a middle portion flanked by a pair of side portions extending inwardly from the middle portion, said flexible support members comprising webs of flexible material attached to the upper parts of said side portions of said skirt members, a flexible wall extending between the outer ends of the support members and the vehicle body and a series of ties extending between the inner ends of the support members and the vehicle body, the ends of the webs being folded back to form loops for attaching the skirt members to said wall and to said first mentioned ties, whereby operating loads imposed on the skirt members are accepted by the support members and are transferred to the vehicle body by way of the flexible wall and the ties.